United States Patent
Liu et al.

(10) Patent No.: US 11,146,365 B2
(45) Date of Patent: Oct. 12, 2021

(54) METHOD AND APPARATUS FOR CONTROLLING DATA RETRANSMISSION IN MULTIUSER MIMO SYSTEM

(71) Applicant: Telefonaktiebolaget LM Ericsson (publ), Stockholm (SE)

(72) Inventors: Chunhui Liu, Beijing (CN); Huaisong Zhu, Beijing (CN); Yipeng Zhang, Beijing (CN)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 16/071,188

(22) PCT Filed: Dec. 5, 2017

(86) PCT No.: PCT/CN2017/114603
§ 371 (c)(1),
(2) Date: Jul. 19, 2018

(87) PCT Pub. No.: WO2019/109244
PCT Pub. Date: Jun. 13, 2019

(65) Prior Publication Data
US 2021/0194641 A1    Jun. 24, 2021

(51) Int. Cl.
*H04B 7/02* (2018.01)
*H04L 1/18* (2006.01)
(Continued)

(52) U.S. Cl.
CPC .......... *H04L 1/1854* (2013.01); *H04L 1/0001* (2013.01); *H04L 1/1887* (2013.01); *H04W 28/04* (2013.01); *H04L 2001/0094* (2013.01)

(58) Field of Classification Search
CPC ... H04L 1/1854; H04L 1/1887; H04L 1/0001; H04L 2001/0094; H04W 28/04
(Continued)

(56) References Cited

U.S. PATENT DOCUMENTS

| 8,503,338 B2 | 8/2013 | Jongren et al. |
| 8,867,478 B2 | 10/2014 | Nayeb Nazar et al. |

(Continued)

FOREIGN PATENT DOCUMENTS

| CA | 2 780 390 A1 | 5/2011 |
| CN | 102056228 A | 5/2011 |

(Continued)

OTHER PUBLICATIONS

3GPP TS 36.211 v10.0.0; Technical Specification; 3rd Generation Partnership Project; Technical Specification Group Radio Access Network; Evolved Universal Terrestrial Radio Access (E-UTRA); Physical Channels and Modulation (Release 10)—Dec. 2010.
(Continued)

*Primary Examiner* — Don N Vo
(74) *Attorney, Agent, or Firm* — Baker Botts, LLP

(57) ABSTRACT

Embodiments of the present disclosure provide methods, apparatus and computer readable storage medium for controlling data retransmission in a multi-user system. A method comprises determining whether data transferred by any of multiple users are received unsuccessfully. The multiple users share a same resource in a feedback channel, for carrying feedback information of whether or not data transferred by respective users are received successfully. When data transferred by any of the multiple users are received unsuccessfully, the method also comprises causing data retransmission in a first retransmission mode or a second retransmission mode. In the first retransmission mode, positive feedback is sent via the same resource to the multiple users, and adaptive retransmission is triggered for the users whose data are received unsuccessfully. In the second retransmission mode, negative feedback is sent via the same resource to the multiple users, so that non-adaptive retransmission is triggered for the multiple users.

12 Claims, 6 Drawing Sheets

(51) Int. Cl.
*H04L 1/00* (2006.01)
*H04W 28/04* (2009.01)

(58) Field of Classification Search
USPC .................. 375/260, 267, 295; 714/726
See application file for complete search history.

(56) References Cited

U.S. PATENT DOCUMENTS

| | | | |
|---|---|---|---|
| 2007/0260956 A1* | 11/2007 | Terry .................... | H04L 1/1861 714/748 |
| 2013/0128821 A1 | 5/2013 | Hooli et al. | |
| 2013/0229906 A1* | 9/2013 | Akkarakaran ........ | H04L 5/0044 370/216 |
| 2014/0018116 A1* | 1/2014 | Novak .................. | H04L 1/1825 455/501 |
| 2014/0204893 A1 | 7/2014 | Horiuchi et al. | |
| 2015/0103796 A1 | 4/2015 | Chung et al. | |
| 2016/0007360 A1 | 1/2016 | Nguyen et al. | |
| 2019/0191429 A1* | 6/2019 | Stern-Berkowitz ......................... | H04W 72/048 |

FOREIGN PATENT DOCUMENTS

| | | |
|---|---|---|
| CN | 102754381 A | 10/2012 |
| CN | 103825686 A | 5/2014 |
| CN | 106452690 A | 2/2017 |
| WO | 2014 148284 A1 | 9/2014 |
| WO | 2016 204807 A1 | 12/2016 |

OTHER PUBLICATIONS

Extended European Search Report issued for Application No. Patent No. 17933911.4-1213 / 3685605 PCT/CN2017114603—dated Mar. 16, 2021.

3GPP TSG-RAN WG2 Meeting #100; Reno, US; Change Request; Title: Running CR to introduce shortened TTI and processing time for LTE; Source to WG: Ericsson; Source to TSG: R2 (R2-1712449)—Nov. 27-Dec. 1, 2017.

PCT Notification of Transmittal of the International Search Report and the Written Opinion of the International Searching Authority, or the Declaration for International application No. PCT/CN2017/114603—dated Sep. 3, 2018.

3GPP TSG-RAN WG1 #58bis; Miyazaki, Japan; Source: Ericsson, ST-Ericsson; Title: PHICH for Carrier Aggregation (R1-094272)—Oct. 12-16, 2009.

\* cited by examiner

METHOD AND APPARATUS FOR CONTROLLING DATA RETRANSMISSION IN MULTIUSER MIMO SYSTEM

PRIORITY

This nonprovisional application is a U.S. National Stage Filing under 35 U.S.C. § 371 of International Patent Application Serial No. PCT/CN2017/114603 filed Dec. 5, 2017, and entitled "METHOD AND APPARATUS FOR CONTROLLING DATA RETRANSMISSION IN MULTIUSER MIMO SYSTEM" which is hereby incorporated by reference in its entirety.

TECHNICAL FIELD

The non-limiting and exemplary embodiments of the present disclosure generally relate to the technical field of wireless communications, and specifically to methods, apparatus and computer readable storage medium for controlling data retransmission in a Multi-User Multiple-Input Multiple-Output (MU-MIMO) system.

BACKGROUND

This section introduces aspects that may facilitate a better understanding of the disclosure. Accordingly, the statements of this section are to be read in this light and are not to be understood as admissions about what is in the prior art or what is not in the prior art.

Some of the abbreviations used in the disclosure are listed in the following:
MIMO Multiple-Input Multiple-Output
MU-MIMO Multi-User Multiple-Input Multiple-Output
PHICH Physical Hybrid ARQ Indicator Channel
PUSCH Physical Uplink Shared Channel
PDCCH Physical Downlink Control Channel
PCFICH Physical Control Format Indicator Channel
HARQ Hybrid Automatic Repeat reQuest
ACK Acknowledgment
NACK Negative Acknowledgement
RE Resource Element
REG Resource Element Group
PRB Physical Resource Block
CCE Control Channel Element
DCI Downlink Control Information
NDI New Data Indication
FDD Frequency Division Duplexing
TDD Time Division Duplexing
DMRS Demodulation Reference Signal
MIB Master Information Block
IE Information Element
CP Cyclic Prefix
OCC Orthogonal Cover Code
RV Redundancy Version
MCS Modulation and Coding Scheme
DL DownLink
UL UpLink
LTE Long Term Evolution
eNB Evolved NodeB
UE User Equipment
3GPP Third Generation Partnership Project Multiple-Input Multiple-Output (MIMO) technology is becoming mature for wireless communications and has been incorporated into wireless broadband standards, such as LTE and Wi-Fi. Generally, the more antennas a transmitter/receiver is equipped with, the more possible signal paths can be got and the better the performance becomes in terms of data rate and link reliability. Massive MIMO technology further brings huge improvements in throughput and energy efficiency by use of a very large number of service antennas (e.g., hundreds or thousands) that are operated fully coherently and adaptively.

Generally, with assistance of great spatial processing capacity from massive MIMO technology, a system tends to do inter-UE spatial multiplexing on traffic channel to increase system throughput at the sacrifice of some degree of robustness. However, relative high robustness is necessary for HARQ feedback channels. This means that an additional physical layer design shall be implemented to ensure that base stations can simultaneously feedback HARQ transmission status (ACK or NACK) for a large number of user terminals (e.g., tens or hundreds).

For example, in LTE, multiple physical hybrid-ARQ indicator channel (PHICH) resources shall be allocated for different MU-MIMO UEs to assist the UEs to distinguish eNB feedback signals. However, the PHICH resource is limited, and then a PHICH collision may occur among multiple users (e.g. practically among their UEs). PHICH physical resource assignment may be determined by the first Physical Resource Block (PRB) allocated and the cyclic shift. Various methods have been proposed for PHICH assignment. For example, when beamforming is employed, the same PRBs may be assigned to multiple users. Since the number of available cyclic shifts is limited, when users sharing the same first PRB assigned are more than available cyclic shifts, a PHICH collision may occur among those users/UEs. Alternatively, even users/UEs assigned with different first PRBs may have a PHICH collision.

In a word, this problem is triggered by powerful MU-MIMO capacity introduced by massive MIMO. Thus, it is a common issue for systems with massive MIMO technology.

SUMMARY

Various embodiments of the present disclosure mainly aim at providing methods, apparatus and computer programs for controlling data retransmission in a Multi-User Multiple-Input Multiple-Output system. Other features and advantages of embodiments of the present disclosure will also be understood from the following description of specific embodiments when read in conjunction with the accompanying drawings, which illustrate, by way of example, the principles of embodiments of the present disclosure.

In a first aspect of the disclosure, there is provided a method for controlling data retransmission in a multi-user system. The method comprises determining whether data transferred by any of multiple users are received unsuccessfully. The multiple users share a same resource in a feedback channel for carrying feedback information of whether or not data transferred by respective users are received successfully. When data transferred by any of the multiple users are received unsuccessfully, the method causes data retransmission in a first retransmission mode or a second retransmission mode. In the first retransmission mode, positive feedback is sent via the same resource to the multiple users, and adaptive retransmission is triggered for the users whose data are received unsuccessfully. In the second retransmission mode, negative feedback is sent via the same resource to the multiple users so that non-adaptive retransmission is triggered for the multiple users.

In one embodiment, the data retransmission may by caused by selecting the first retransmission mode or the second retransmission mode for the data retransmission according to a predetermined scheme, so as to cause data retransmission. The predetermined scheme may be defined based on at least one of the following: a ratio of the number of users whose data are received successfully to the number of the multiple users; an amount of available resources in a control channel; and a probability that resource collisions in the feedback channel occur.

In one embodiment, the method may select the first retransmission mode for the data retransmission in a case where the ratio is higher than a first threshold. Alternatively or additionally, the method may select the second retransmission mode for the data retransmission in a case where the ratio is lower than a second threshold. The first threshold and the second threshold may be defined based on at least one of an amount of available resources in a control channel and an amount of available resources in a data traffic channel.

In one embodiment, the method may further comprise assigning the same resource in the feedback channel to the multiple users.

In one embodiment, when data retransmission in the first retransmission mode is caused, the method may further send positive feedback via the same resource to the multiple users, and trigger an adaptive retransmission for the users whose data are received unsuccessfully. Alternatively or additionally, when data retransmission in the second retransmission mode is caused, the method may further send negative feedback via the same resource to the multiple users so that non-adaptive retransmission is triggered for the multiple users.

In one embodiment, the system may be a Multi-User Multiple-Input Multiple-Output system. The feedback channel may be a Physical Hybrid ARQ Indicator Channel. In one embodiment, the method may send to the users whose data are received unsuccessfully, downlink control information with a new data indication not toggled.

In a second aspect of the disclosure, there is provided an apparatus for controlling data retransmission in a multi-user system. The apparatus comprises a determining unit configured to, determine whether data transferred by any of multiple users are received unsuccessfully. The multiple users share a same resource in a feedback channel for carrying feedback information of whether or not data transferred by respective users are received successfully. The apparatus further comprises a retransmission controlling unit, configured to cause data retransmission in a first retransmission mode or a second retransmission mode when data transferred by any of the multiple users are received unsuccessfully. In the first retransmission mode, positive feedback is sent via the same resource to the multiple users, and adaptive retransmission is triggered for the users whose data are received unsuccessfully. In the second retransmission mode, negative feedback is sent via the same resource to the multiple users so that non-adaptive retransmission is triggered for the multiple users.

In one embodiment, the retransmission controlling unit may comprise a selection unit, configured to select the first retransmission mode or the second retransmission mode for the data retransmission according to a predetermined scheme. The selection unit may be further configured to select the first retransmission mode for the data retransmission, in a case where a ratio of the number of users whose data are received successfully to the number of the multiple users is higher than a first threshold. Alternatively or additionally, the selection unit may be further configured to select the second retransmission mode for the data retransmission in a case where the ratio is lower than a second threshold.

In one embodiment, the apparatus may further comprise a resource assigning unit, configured to assign a same resource in the feedback channel to the multiple users.

In one embodiment, the apparatus may further comprise a first retransmission unit configured to, when data retransmission in the first retransmission mode is caused, send positive feedback via the same resource to the multiple users, and trigger an adaptive retransmission for the users whose data are received unsuccessfully. Alternatively or additionally, the apparatus may further comprise a second retransmission unit configured to, when data retransmission in the second retransmission mode is caused, send negative feedback via the same resource to the multiple users so that non-adaptive retransmission is triggered for the multiple users.

In a third aspect of the disclosure, there is provided an apparatus for controlling data retransmission in a multi-user system. The apparatus may comprise a processor and a memory communicatively associated with the processor. The memory may have computer coded instructions stored therein, said instructions when executed by the processor causing the apparatus to perform the method according to the first aspect of the present disclosure.

In a fourth aspect of the disclosure, there is provided an apparatus for controlling data retransmission in a multi-user system. The apparatus may comprise process means adapted to perform any method in accordance with the first aspect of the disclosure.

In a fifth aspect of the disclosure, there is provided a computer readable storage medium, on which stored computer code instructions. When the computer code instructions are executed on at least one processor, at least one processor is caused to carry out the method according to the first aspect of the disclosure.

According to the various aspects and embodiments as mentioned above, an issue of resource collisions among multiple users in a feedback channel, e.g. PHICH, can be resolved.

BRIEF DESCRIPTION OF THE DRAWINGS

The above and other aspects, features, and benefits of various embodiments of the present disclosure will become more fully apparent, by way of example, from the following detailed description with reference to the accompanying drawings, in which like reference numerals or letters are used to designate like or equivalent elements. The drawings are illustrated for facilitating better understanding of the embodiments of the disclosure and not necessarily drawn to scale, in which.

DETAILED DESCRIPTION

Figure 1:
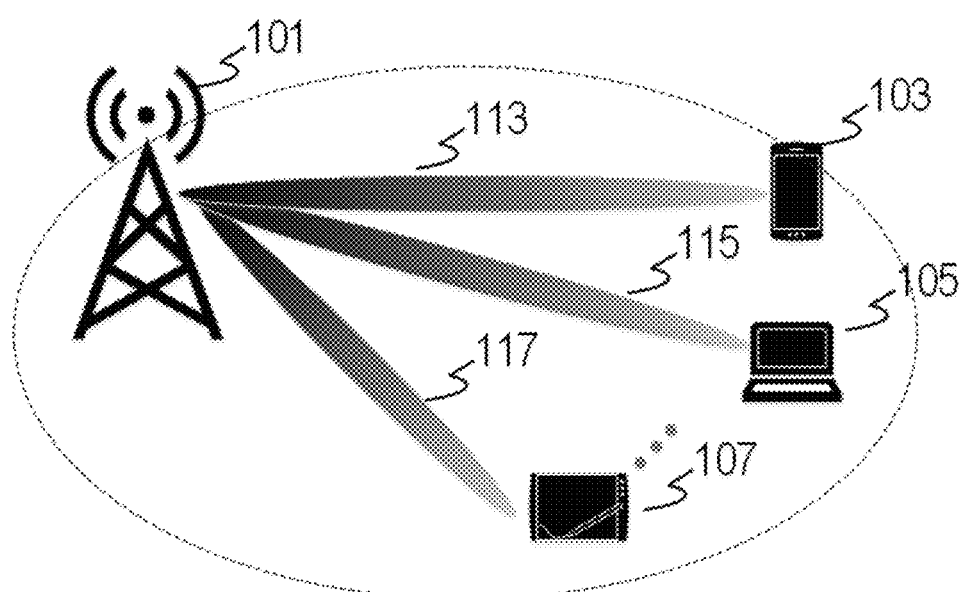
FIG. 1 illustrates a schematic diagram of an MU-MIMO system.

Hereinafter, the principle and spirit of the present disclosure will be described with reference to illustrative embodiments. It should be understood, all these embodiments are given merely for one skilled in the art to better understand and further practice the present disclosure, but not for limiting the scope of the present disclosure. For example, features illustrated or described as part of one embodiment may be used with another embodiment to yield still a further embodiment. In the interest of clarity, not all features of an actual implementation are described in this specification.

References in the specification to "one embodiment," "an embodiment," "an example embodiment," etc. indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that, although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

The terminology used herein is for the purpose of describing particular embodiments only and is not intended to be liming of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

In the following description and claims, unless defined otherwise, all technical and scientific terms used herein have the same meaning as commonly understood by one of ordinary skills in the art to which this disclosure belongs. For example, the term "device" used herein may refer to any terminal device or user equipment (UE) having wireless communication capabilities, including but not limited to, mobile phones, cellular phones, smart phones, or personal digital assistants (PDAs), portable computers, image capture devices such as digital cameras, gaming devices, music storage and playback appliances, wearable devices, vehicle-mounted wireless device and the like. Furthermore, user equipment that is not mobile may also readily employ embodiments of the present invention. In the following description, the terms "devices", "terminal device", "user equipment" and "UE" may be used interchangeably. Similarly, the term "access node" may represent a base station (BS), a node B (NodeB or NB), an evolved NodeB (eNodeB or eNB), a Remote Radio Unit (RRU), a radio head (RH), a remote radio head (RRH), a relay node (RN), a low power node (LPN) such as a femto, a pico, an access point (AP) and so forth.

For illustrative purposes, several embodiments of the present disclosure will be described in the context of a 3GPP LTE system. Those skilled in the art will appreciate, however, that the concept and principle of the several embodiments of the present disclosure may be more generally applicable to other wireless networks, for example a third generation (3G) CDMA-based network or a future network (e.g., a 5G or New Radio (NR) system).

The non-limiting and exemplary embodiments of the present disclosure relate to data retransmission in an MU-MIMO system. MU-MIMO is realized through uplink beamforming. Uplink beamforming is a signal processing technique for directional reception. This is achieved by combining antenna elements in a phased array in such a way that a signal at a particular angle experiences constructive interference while others experience destructive interference. It benefits receivers to have signals from the desired users together with nulling out the directions from the interfering users. In other words, while performing uplink beamforming, the same frequency and time resources, e.g., physical resource blocks (PRBs) and time slots in LTE physical uplink shared channel (PUSCH), may be assigned to a group of users to realize spatial division multiplexing (SDM). Interference among them can be mitigated by beamforming reception. By doing so, multiuser (MU) multi-input and multi-output (MIMO) is realized.

FIG. 1 illustrates a schematic diagram of an MU-MIMO system which includes an access node 101 in a form of an eNB and multiple devices (shown as 103-107). As shown in FIG. 1, the eNB can communicate with the multiple devices 103, 105, and 107. The eNB 101 can be equipped with multiple antennas or antenna arrays, which can form different directional wave beams (shown as 113, 115, 117) to different devices 103, 105, and 107. According to the MU-MIMO technique, the eNB 101 can transmit signals to the multiple devices via same frequency and time resources. In terms of MU-MIMO technique, the multiple devices may also be referred to as multiple users of an MU-MIMO system. The devices 103, 105, and 107 may be mobile terminals or other types of user equipment. The devices 103, 105, and 107 may each be equipped with only one antenna for transmitting signals to and for receiving signals from the eNB 101.

Due to imperfection of uplink beamforming in realistic systems, an inter-user interference may exist. Meanwhile, signals may experience other kinds of interferences, such as inter-cell interference. These interferences may lead to incorrect transmission. In order to correct the error packets in physical layer of LTE, hybrid automatic repeat request (HARQ) is adopted by combining high-rate forward error-correcting coding and ARQ error-control.

For example, in 4.5G LTE, a physical hybrid-ARQ indicator channel (PHICH) in the downlink carriers can be assigned to a UE for informing Hybrid ARQ (HARQ) acknowledgements (ACK/NACK) for uplink data transmission of the UE. In a future communication system, the PHICH channel may be removed, while there shall be a downlink channel that informs UE of whether HARQ transmission or retransmission success or not, in a similar way as the PHICH. For simplicity, in the following description, PHICH in LTE is taken as an example. However, it would be appreciated that embodiments of the disclosure are not limited to the only use for PHICH in LTE. Instead, the embodiments of the disclosure can be applied for solving the collision in any feedback channel for data retransmission. For example, the embodiments can be extended for future acknowledgement channels.

According to 3GPP specifications of 4.5G LTE, PHICHs are located at the first OFDM symbol of each subframe. Multiple PHICHs can share the same set of resource element groups (REGs) and are differentiated by orthogonal covers. PHICHs which share the same resources are called a PHICH group. Maximum 8 PHICHs can be multiplexed into a PHICH group when we use a normal cyclic prefix (CP). The number of PHICH groups can be determined by the system bandwidth. More details of the PHICH can be found in 3GPP TS 36.211 v10.0.0.

The more multiuser layers are employed, the higher the probability of PHICH collisions increases. There are some existing solutions concerned with PHICH collisions. Some solutions suggest enlarging the PHICH resource, for example by conveying a PHICH offset to accommodate more users at the same frequency and timing resource. Some solutions propose methods to avoid potential PHICH collisions by choosing orthogonal cover codes (OCCs) at base stations, which however cannot be easily transplanted to an MU-MIMO system. Some solutions consider PHICH collisions in the presence of cluster PUSCHs. In one word, all solutions mentioned before may either enlarge PHICH resource with OCC, offset or other means, or avoid PHICH collisions by a smart allocation method. However, this may result in changes on 3GPP or much effort in development for the whole mobile communication business. Some smart allocation methods can only reduce the probabilities of PHICH collisions in an MU-MIMO system, while they cannot resolve the collisions completely. This may even induce high computing complexity, and may limit scheduling abilities of eNB.

The non-limiting and exemplary embodiments of the present disclosure propose an add-on method to handle the same PHICH resource among users, instead of purely avoiding PHICH collisions in the scheduling phase. When scheduling multiple users for MU-MIMO, a system according to embodiments of the present disclosure can try to reduce the PHICH collisions as the prior-art. However, if it is not avoidable, the system still allows for PHICH collisions, i.e., the same PHICH resource is shared among multiple users or UEs. Thereafter, a method is proposed to dynamically control retransmissions according to the present disclosure for solving PHICH collisions.

Then, the induced PHICH collisions will be analyzed. When a PHICH collision occurs, multiple users would share a same PHICH resource. Normally, HARQ feedback for uplink transmissions of each of the multiple users would be transmitted via the same PHICH resource, i.e. via same frequency and time resources. If the multiple users would have same HARQ feedback for their uplink transmissions, the same HARQ feedback will be sent out through the same PHICH resource. Then the PHICH collision and retransmission controlling is transparent to all of the multiple users. In this regard, the retransmission controlling can be a regular process from the perspective of the users, and a user would not be aware that he/she is sharing a same PHICH resource with other users.

If the multiple users would have different HARQ feedback for their uplink transmissions, it is hard for each of the multiple users to identify its own feedback from others. The system according to the present disclosure will judge if a majority of the multiple users would have NACK or ACK. When a majority of the users would have ACK, the system can feed back ACK to all of the multiple users. For those users who would actually have NACK, feeding back ACK only postpones the non-adaptive retransmission. The system would then trigger adaptive retransmission for those users in follow-up scheduling. Those triggered adaptive retransmissions would consume resources in control channels, such as Control Channel Element (CCE) at Physical Downlink Control Channel (PDCCH). When a majority of the users have NACK, then the system can feed back NACK to all of the multiple users. This NACK feedback can trigger non-adaptive retransmission for all of the multiple users. This would introduce unnecessary retransmissions from users who would actually have ACK, and system throughput loss. However, this can avoid ambiguity about which user has ACK and which user has NACK, at the receiver side (e.g. at eNB). At the same time, extra CCE (Control Channel Element) consumption can be avoided.

Here, "majority" can be measured based on a ratio of the number of users having specific HARQ feedback (e.g. users whose uplink transmissions are received successfully and then would have ACK as feedback) to the total number of the multiple users sharing the same PHICH resources. For example, if the ratio is greater than a certain threshold, it can be determined a majority of users having specific HARQ feedback. The threshold can be determined by or adjusted, for example, according to an amount of available resources in control channels and data traffic channel. In some cases, it can be simply defined as 0.5. In a word, according to the ratio, an amount of the available resources, a probability of PHICH collisions or other criterion, the system according to the present disclosure can use different strategies to balance the PHICH collision and system throughput.

Figure 2:
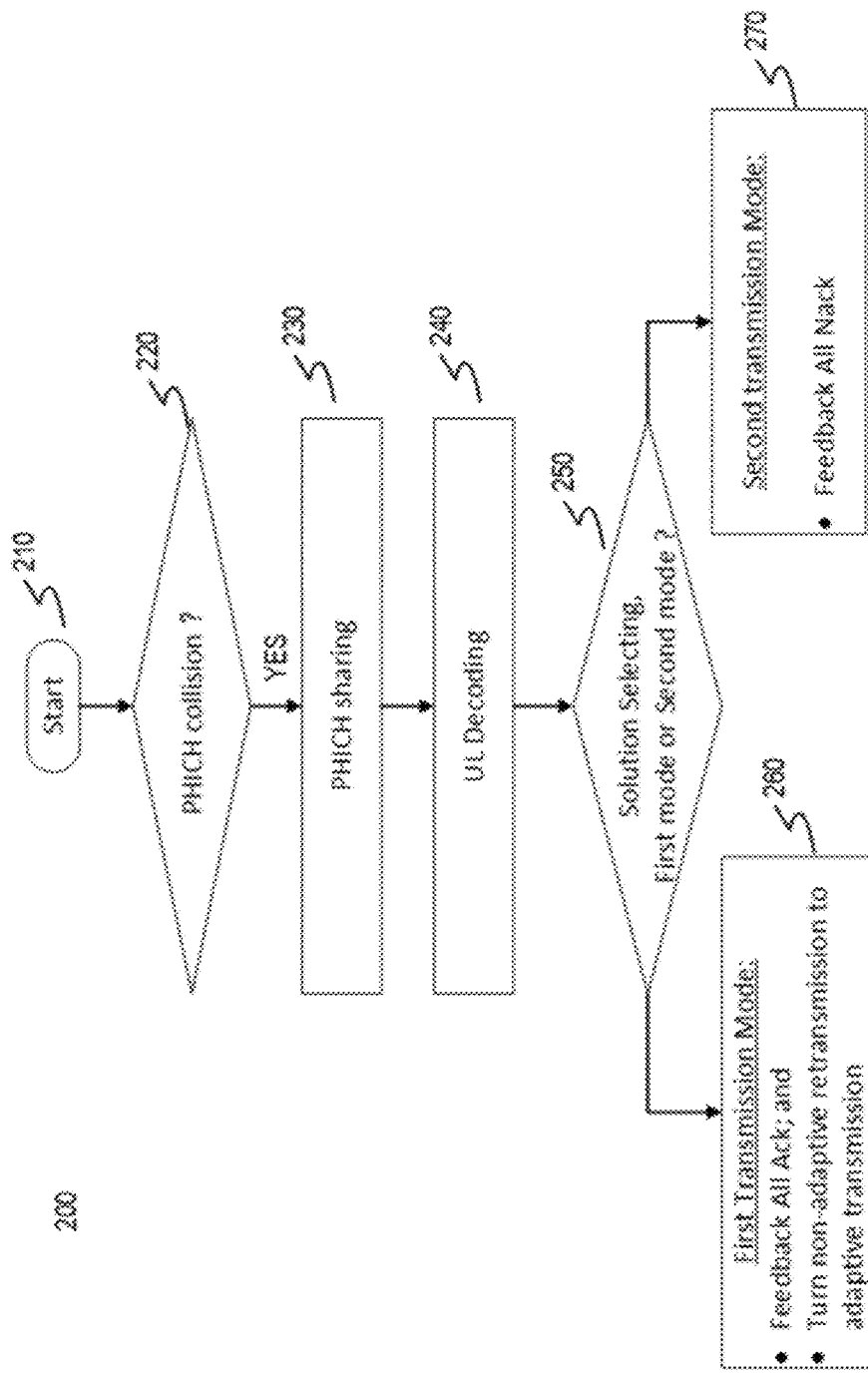
FIG. 2 illustrates a flowchart of a method according to at least part of embodiments of the present disclosure.

Reference is now made to FIG. 2, which shows a flowchart of a method 200 according to an embodiment of the present disclosure. The method 200 can be at least partially implemented at an access node in a radio access network (RAN). The access node may be, for example, a base station, or an evolved Node B like the eNB 101 as shown in FIG. 1. As described above, PHICH in LTE is taken as an example of feedback channel in the present disclosure.

For better understanding of an application scenario of embodiments, basic features of PHICH are introduced firstly. PHICH is a specially designed downlink-only channel in LTE, which carries ACK or NACK for data transmission of PUSCH received by network-side devices, e.g. eNB. Some key insights of PHICH are listed below.

PHICH is carried by the first symbol of each subframe. (It is located at the same symbol as PCFICH).

One PHICH is carried by multiple resource elements.

Multiple PHICHs can be carried by a same set of resource elements, and these multiple PHICHs being carried by the same set of resource elements constitute a "PHICH group". These multiple PHICHs in a PHICH group are multiplexed by a set of predefined orthogonal codes.

Therefore, a specific PHICH can be identified with a PHICH group number and an orthogonal code index.

Table 1 illustrates a set of orthogonal sequences of orthogonal codes defined in 3GPP TS 36.211 v10.0.0.

TABLE 1

| Orthogonal sequences $[w(0) \ldots w(N_{SF}^{PHICH} - 1)]$ for PHICH | | |
|---|---|---|
| | Orthogonal sequence | |
| Sequence index $n_{PHICH}^{seq}$ | Normal cyclic prefix $N_{SF}^{PHICH} = 4$ | Extended cyclic prefix $N_{SF}^{PHICH} = 2$ |
| 0 | [+1 +1 +1 +1] | [+1 +1] |
| 1 | [+1 −1 +1 −1] | [+1 −1] |
| 2 | [+1 +1 −1 −1] | [+j +j] |
| 3 | [+1 −1 −1 +1] | [+j −j] |

TABLE 1-continued

| Orthogonal sequences $[w(0) \ldots w(N_{SF}^{PHICH} - 1)]$ for PHICH | | |
|---|---|---|
| | Orthogonal sequence | |
| Sequence index $n_{PHICH}^{seq}$ | Normal cyclic prefix $N_{SF}^{PHICH} = 4$ | Extended cyclic prefix $N_{SF}^{PHICH} = 2$ |
| 4 | [+j +j +j +j] | — |
| 5 | [+j −j +j −j] | — |
| 6 | [+j +j −j −j] | — |
| 7 | [+j −j −j +j] | — |

As shown in Table 1, when multiple PHICHs get multiplexed, they use a certain length of orthogonal code. In case of a normal CP (Cyclic Prefix), the length of the orthogonal code is 4, and in case of an extended CP, the length of the orthogonal code is 2. As mentioned above, multiple PHICH data can be located in the same physical locations (i.e. in the same REs). The multiple PHICHs that are multiplexed in the same location are referred to as a "PHICH group". The number of PHICHs belonging to a single PHICH group is determined by a parameter from the higher layer, e.g. phich-Resource IE (Information Element) in MIB (Master Information Block). This number is also determined by whether the transmission mechanism is FDD (Frequency Division Duplexing) or TDD (Time Division Duplexing). In case of TDD, this varies depending on a subframe configuration of PHICHs. For example, there is a maximum of 8 PHICHs that can be multiplexed into a PHICH group when the normal CP as shown in the Table 1 is used for PHICH, and there is a maximum of 4 PHICHs that can be multiplexed into a PHICH group when the extended CP as shown in the Table 1 is used for PHICH. Zero PHICH in a PHICH group is also allowed.

The number of PHICH groups supported in a system is determined by the system bandwidth and a special parameter called Ng. The values of the system bandwidth and Ng can be also carried by parameters from the higher layer, e.g. in MIB. For example, with the Ng and a N_RB (which indicates a maximum number of RB for a system bandwidth), the number of supported PHICH groups can be calculated as in the following Table 2. For example, when the system bandwidth indicated with N_RB is 15 Mhz, and the Ng is ½, five PHICH groups can be supported.

TABLE 2

| Number of supported PHICH groups | | | | |
|---|---|---|---|---|
| N_RB\Ng | 1/6 | 1/2 | 1 | 2 |
| 6 (1.4 Mhz) | 1 | 1 | 1 | 2 |
| 15 (3 Mhz) | 1 | 1 | 2 | 4 |
| 25 (5 Mhz) | 1 | 2 | 4 | 7 |
| 50 (10 Mhz) | 2 | 4 | 7 | 13 |
| 75 (15 Mhz) | 2 | 5 | 10 | 19 |
| 100 (20 Mhz) | 3 | 7 | 13 | 25 |

Each PHICH in a PHICH group is mapped to a UE (also referred to as a user). As mentioned above, a specific PHICH can be identified with a PHICH group number and an orthogonal code index. A UE can figure out these two numbers from the lowest PRB (Physical Resource Block) index of the first slot of the PUSCH transmission and DMRS (Demodulation Reference Signal) cyclic shift. Details of PHICH assignment is described in 3GPP TS 36.211 v10.0.0.

As discussed before, MU-MIMO can be realized to enhance system throughput for both downlink and uplink in 4.5G and 5G. For realizing uplink MU-MIMO, feedback resources must be allocated to each scheduled UE for feeding back HARQ results, i.e., NACK or ACK. According to a normal PHICH assignment scheme, PHICH collisions may occur. An example of PHICH collisions is illustrated with reference to the following Table 3.

In Table 3, indexes of PRB (Physical Resource Block) are listed vertically and indexes of DMRS cyclic shifts are listed horizontally, respectively. The cyclic shifts for each PRB are given in Table 3. As shown below, same PRBs are assigned to 8 users. That means 8 layers are adopted. PHICHs carried on the 14 PRBs with indexes 0 to 13 constitute one PHICH group. The remaining PRBs are assigned to another group of users (shown by the shadow boxes), and these PRBs with PRB indexes 14 to 25 constitute another PHICH group. As mentioned above, PHICH physical resource assignment may be determined by the first PRB allocated and the cyclic shift. Then, PHICH collisions may occur.

As shown in table 3, a PHICH with the first PRB of index 0 and CS index 1 is in a collision with a PHICH with the first PRB of index 14 and CS index 0, because they are located at a same resource with a same orthogonal code of index 9. Similarly, a PHICH with the first PRB of index 0 and CS index 2 is in a collision with a PHICH with the first PRB of index 14 and CS index 1, because they are located at a same resource with a same orthogonal code of index 18. As highlighted with underscores, there exist seven groups of users encountering PHICH collisions. In each group, a PHICH collision occurs between two users.

TABLE 3

| Exemplary PHICH assignment and PHICH collisions | | | | | | | | |
|---|---|---|---|---|---|---|---|---|
| | CS index | | | | | | | |
| PRB index | 0 | 1 | 2 | 3 | 4 | 5 | 6 | 7 |
| 0 | 0 | *9* | *18* | *27* | *36* | *45* | *54* | *63* |
| 1 | 8 | 17 | 26 | 35 | 44 | 53 | 62 | 71 |
| 2 | 16 | 25 | 34 | 43 | 52 | 61 | 70 | 79 |
| 3 | 24 | 33 | 42 | 51 | 60 | 69 | 78 | 87 |
| 4 | 32 | 41 | 50 | 59 | 68 | 77 | 86 | 95 |
| 5 | 40 | 49 | 58 | 67 | 76 | 85 | 94 | 103 |
| 6 | 48 | 57 | 66 | 75 | 84 | 93 | 102 | 7 |
| 7 | 56 | 65 | 74 | 83 | 92 | 101 | 6 | 15 |
| 8 | 64 | 73 | 82 | 91 | 100 | 5 | 14 | 23 |
| 9 | 72 | 81 | 90 | 99 | 4 | 13 | 22 | 31 |
| 10 | 80 | 89 | 98 | 3 | 12 | 21 | 30 | 39 |
| 11 | 88 | 97 | 2 | 11 | 20 | 29 | 38 | 47 |
| 12 | 96 | 1 | 10 | 19 | 28 | 37 | 46 | 55 |
| 13 | 1 | 10 | 19 | 28 | 37 | 46 | 55 | 56 |
| 14 | *9* | *18* | *27* | *36* | *45* | *54* | *63* | 64 |
| 15 | 17 | 26 | 35 | 44 | 53 | 62 | 71 | 72 |
| 16 | 25 | 34 | 43 | 52 | 61 | 70 | 79 | 80 |
| 17 | 33 | 42 | 51 | 60 | 69 | 78 | 87 | 88 |
| 18 | 41 | 50 | 59 | 68 | 77 | 86 | 95 | 96 |
| 19 | 54 | 58 | 67 | 76 | 85 | 94 | 103 | 0 |
| 20 | 57 | 66 | 75 | 84 | 93 | 102 | 7 | 8 |
| 21 | 65 | 74 | 83 | 92 | 101 | 6 | 15 | 16 |
| 22 | 73 | 82 | 91 | 100 | 5 | 14 | 23 | 24 |
| 23 | 81 | 90 | 99 | 4 | 13 | 22 | 31 | 32 |
| 24 | 89 | 98 | 3 | 12 | 21 | 30 | 39 | 40 |
| 25 | 97 | 2 | 11 | 20 | 29 | 38 | 47 | 48 |

If the PHICH resource cannot be extended, for example by extending the number of available orthogonal codes or adding available PRBs, a straightforward method is to decline a potential uplink transmissions that conflicts prior scheduled uplink transmissions due to PHICH collisions as mentioned above, for example. Alternatively, PRB 14 can be skipped for the second PHICH group. That means only PRBs with indexes of 15 to 25 are assigned to another group.

However, there are at least two drawbacks for both of these schemes. One drawback is throughput degradation, which is counter-productive by MU MIMO. The other drawback is scheduling complexity increasing, which limits scheduling abilities of eNBs.

Further, in the example shown above with Table 3, only 8 layers are applied and then PHICH assignment may be collided between two users. The more layers are used, the more users may have PHICH collisions and the higher collision probability become. For example, if 16 layers are used, PHICH collisions may occur among four users, and it may occur for every uplink subframe. Then, it would be hard for the prior solutions to mitigate the PHICH collisions.

Different from the prior solutions, the present disclosure proposes a solution to allow for PHICH collisions. Now, reference is again made to FIG. 2. At block 210, a process according to the present disclosure starts. Then, in one embodiment, at block 220, it is determined whether a PHICH collision occurs. For example, when the MU-MIMO system bears too many users, e.g. more than 8 layers of users are adopted, it is determined that resources in PHICH is insufficient, it is hard to avoid a PHICH collision, and thus the PHICH collision may occur. If the PHICH collision occurs, the process can proceed to assign a same PHICH resource to multiple users, or the UEs of these multiple users. In other words, the multiple users/UEs are allowed to share a same PHICH resource, as shown at block 230.

Then, retransmission controlling according to the present disclosure would be applied to these multiple users/UEs, that share a same PHICH resource. Let us assume that a same one PHICH resource is assigned to K users. The process can proceed to monitor data transfers from the multiple users (or practically from their UEs), and determine whether the transferred data are received successfully. In one embodiment, as shown in block 240, the process can proceed to decode uplink data from the multiple users. If the data are decoded correctly, it can be determined that the data are received successfully. For example, the data can be checked by virtue of CRC (Cyclic Redundancy Check), FEC (Forward Error Correction) techniques and the like. In some embodiments, the data may be lost, and cannot be received. However, for the uplink data, generally eNB would know that a user has transferred certain data to it. Then, the eNB can be able to determine that there exist certain data that are not received successfully.

Next, according to the determination of whether the transferred data are received successfully, the process can proceed to decide which solution shall be applied for retransmission control. For the sake of clarity, it is assumed that there are m users whose uplink data are received successfully, and uplink data from the other (K−m) users are received unsuccessfully. According to a normal retransmission scheme, the eNB would feedback m ACKs and (K−m) NACKs to the corresponding users. An ACK ratio can be defined as m/K.

For example, in the exemplary PHICH collision mentioned above with respective to Table 3, a PHICH collision occurs between two users. Then, the two users can be assigned with a same PHICH resource. Feedback for the two users according to the normal retransmission scheme can be listed as the follow Table 4.

TABLE 4

Enumeration of feedbacks for two users

|  | Case 1 | Case 2 | Case 3 | Case 4 |
| --- | --- | --- | --- | --- |
| User1 | NACK | ACK | NACK | ACK |
| User2 | NACK | NACK | ACK | ACK |

If both users have NACK feedback as shown in case 1, then the eNB shall schedule retransmission for the two users by feeding back NACK to them. Although the feedback is carried by a shared PHICH resource, it would not cause any ambiguous feedback for the two users. No loss is expected, whichever feedback is received by the users.

Similarly, if both users have ACK feedback as shown in case 4, then eNB shall continue with a new uplink data transmission scheduled. Again, although the feedback is carried by a shared PHICH resource, no loss is expected.

If one user has NACK feedback and another user has ACK feedback as shown in case 2 and case 3, then it is a question how the eNB handles those cases. If the eNB sends both NACK feedback and ACK feedback in the same PHICH resource, the different feedback would cause ambiguity. For example, the two users could not correctly identify which feedback is the right one for itself. Just for this reason, it is generally not allowed for multiple users to share the same PHICH channel.

The retransmission controlling according to the present disclosure can allow for PHICH collisions, by selecting an appropriate retransmission solution based on conditions of data transmission of the multiple users. In one embodiment, as shown at block 250, the process can proceed to select a first data retransmission mode or a second data retransmission mode based on the feedback decided according to the decoding at block 240. For example, when the ACK ratio m/K is high, e.g. higher than a threshold (e.g. 0.5), only a few number of users out of the users sharing the same PHICH resource have NACK feedbacks. Then, the process can proceed to select a first data retransmission mode. As shown at block 260, when the first data retransmission mode is selected, the eNB can send ACK feedback to all of the users sharing the same PHICH resource, and turn non-adaptive retransmission of users which have NACK feedback at block 240 to adaptive transmission.

According to rules of HARQ process defined in Sections 5.4.2.1 and 5.4.2.2 of 3GPP 36.321 v10.0.0, a UE shall do "non-adaptive retransmission" if it gets a "HARQ feedback (PHICH=NACK)" but does not get DCI (Downlink Control Information) 0. In this case, the UE would retransmit the uplink data by using the same PRBs as its former data transmission in predefined RV (Redundancy Version) and MCS (Modulation and Coding Scheme). As such, no more control signal in a control channel is needed. For example, the eNB need not send any information of DCI 0 in PDCCH.

Meanwhile, according to the rules of HARQ process, a UE shall do "adaptive retransmission" if it detects DCI 0 with NDI (New Data Indication) not toggled. In this case, the UE does not care about "HARQ feedback" in PHICH, and it retransmits only based on the information of DCI 0. In this case, the UE would retransmit the uplink data in PUSCH by using new PRBs and MCS as newly scheduled by the eNB. The DCI 0 and the newly scheduled PRBs and MCS can be indicated to the UE by control signals in a control channel, such as PDCCH. As such, compared with non-adaptive retransmission, adaptive retransmission would require more resources of control channels.

In one embodiment, the eNB can turn on adaptive transmission following the above rules. That is, for the users who are decided to have NACK feedback at block 240, the eNB can send to them DCI 0 with NDI not toggled. Then, UEs of these users shall ignore the ACK feedback in PHICH and retransmit as eNB schedules. However, scheduling adaptive retransmission requires resources in control channels, such as CCEs in PDCCH, which are limited resources especially in LTE. When the number of users needing adaptive retransmission becomes large, resources in control channels may be insufficient.

To avoid this issue, another retransmission mode is given in the present disclosure. As shown at block 250, the process can proceed to select a second retransmission mode. In one embodiment, the second retransmission mode can be selected for CCE-limited scenarios in which resources in control channels may be insufficient. In another embodiment, when the ACK ratio m/K is small, e.g. lower than a threshold (e.g. 0.5), only a few number of users out of users sharing the same PHICH resource have ACK. In other words, a majority of the users sharing the same PHICH resource have NACK feedback. Then, it is unnecessary to turn non-adaptive retransmission to adaptive retransmission for the majority of users, to keep the simplicity of the retransmission controlling. For example, as shown at block 270, when the second data retransmission mode is selected, the eNB can send NACK feedback to all of the users sharing the same PHICH resource. According to the above HARQ rules, the eNB does not send any information of DCI 0 in PDCCH. Then, all of the users would perform non-adaptive retransmission.

Figure 3:
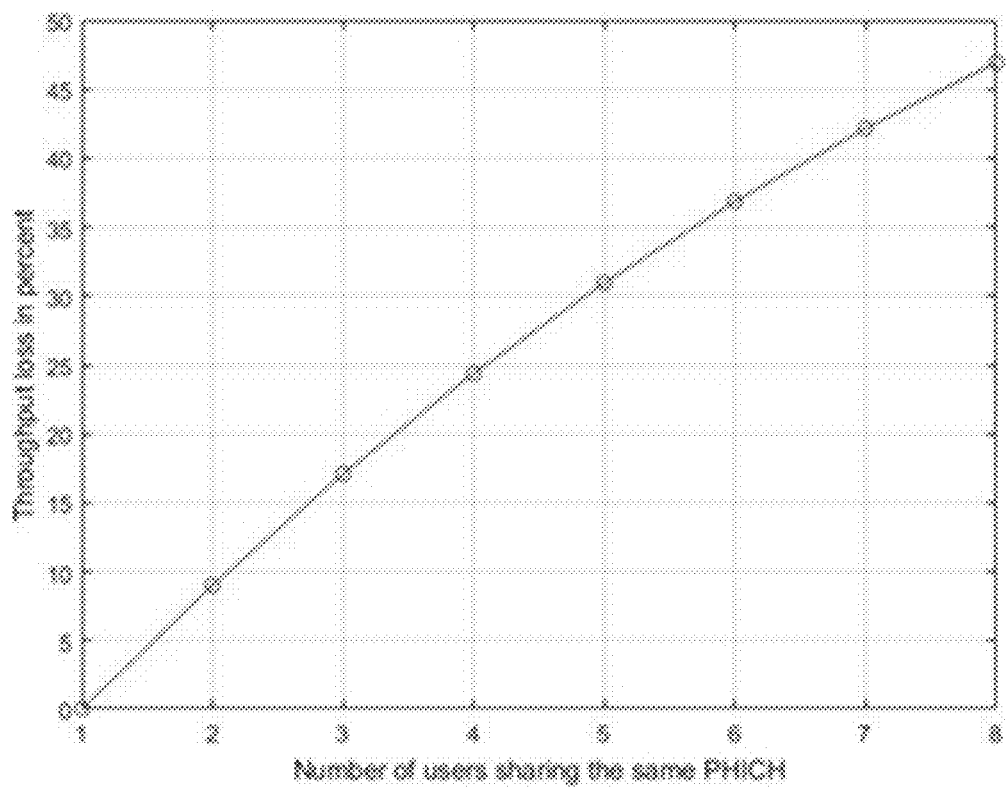
FIG. 3 illustrates a diagram illustrating the throughput loss against different numbers of users sharing a same PHICH resource.

The second retransmission mode may require all users sharing the same PHICH resource to execute retransmission, even though data are successfully received from some of them. Thus, the second retransmission mode would introduce unnecessary retransmission and causes system throughput loss. Table 5 below gives a simple analysis on throughput loss induced by the second retransmission mode as proposed. It is assumed that a block error rate (BLER) target of the system is 10%. The throughput loss due to sharing PHICH is shown in the Table 5 below.

ing to the second retransmission mode, then two out of three retransmissions can be seen as being wasted. It can be estimated that when three users share one PHICH resource, the percent of the wasted retransmission is about (0.243×2/3+0.027×1/3)×100%=17.1%. Accordingly, a chart showing the throughput loss against different numbers of users sharing a same PHICH resource, can be deduced as shown in the FIG. 3.

The number of users allowed for sharing a same PHICH may depend on a probability of PHICH collisions. Generally, the lower this probability is, the more users are allowed for sharing a same PHICH resource. A probability of PHICH collisions may depend on concrete system implementation manners implemented by different companies or network operators.

In the retransmission controlling process, the two retransmission modes could not co-exist. Only one of these two retransmission modes shall be selected. The selection can be based on some predefined criterions. Although in the description of the above embodiment, the ACK ratio is used for selecting a retransmission mode, the selecting can be made according to other criterions. The criterions may comprise at least one of, but not limited to, an ACK ratio, an amount of CCE resources, a probability of PHICH collision, and a combination thereof, etc. Further, it should be appreciated that criterions for the selection are flexible and can depend on concrete system implementation manners and/or system operation scenarios, e.g. concrete beam forming solutions, current traffic load, etc. For example, in the above embodiment, the threshold for ACK ratio can be determined by or adjusted according to an amount of available CCE resources and/or an amount of available data traffic channel resources. In this regard, according to the ratio of the number of ACKs to the number of users sharing the same PHICH resource, the amount of available CCE resources, a probability of PHICH collisions or other criterions, eNBs can use different strategies to balance PHICH collision and system throughput.

By applying the method as proposed in this disclosure, the MU-MIMO system can be more robust to PHICH collisions.

TABLE 5

Probabilities of NACKs

| Number of users | Number of NACKs | | | | | | | | |
| --- | --- | --- | --- | --- | --- | --- | --- | --- | --- |
| | 0 | 1 | 2 | 3 | 4 | 5 | 6 | 7 | 8 |
| 1 | 0.9 | 0.1 | | | | | | | |
| 2 | 0.81 | 0.18 | 0.01 | | | | | | |
| 3 | 0.729 | 0.243 | 0.027 | 0.001 | | | | | |
| 4 | 0.6561 | 0.2916 | 0.0486 | 0.0036 | 0.0001 | | | | |
| 5 | 0.59049 | 0.32805 | 0.0729 | 0.0081 | 0.00045 | 0.00001 | | | |
| 6 | 0.531441 | 0.354294 | 0.098415 | 0.01458 | 0.001215 | 0.000054 | 0.000001 | | |
| 7 | 0.478297 | 0.372009 | 0.124003 | 0.022964 | 0.002552 | 0.00017 | 6.3E−06 | 1E−07 | |
| 8 | 0.430467 | 0.382638 | 0.148803 | 0.033067 | 0.004593 | 0.000408 | 2.27E−05 | 7.2E−07 | 1E−08 |

The number of users sharing the same PHICH resource is listed in the first column. The number of NACKs (K−m) is given in the first row. Probabilities of certain numbers of users (out of users sharing the same PHICH resource) have NACKs, i.e. probabilities of certain numbers of NACKs, are given in the Table 5. For example, when there are three users sharing one PHICH resource, if and only if one of them has NACK, then the probability for this case is 0.1×0.9×0.9×3=0.243. If only one of them has NACK and the other two have ACKs, and all of them shall do retransmission accord- Furthermore, the method can be easily embedded into the current system solution, without needs to change 3GPP standards.

Figure 4:
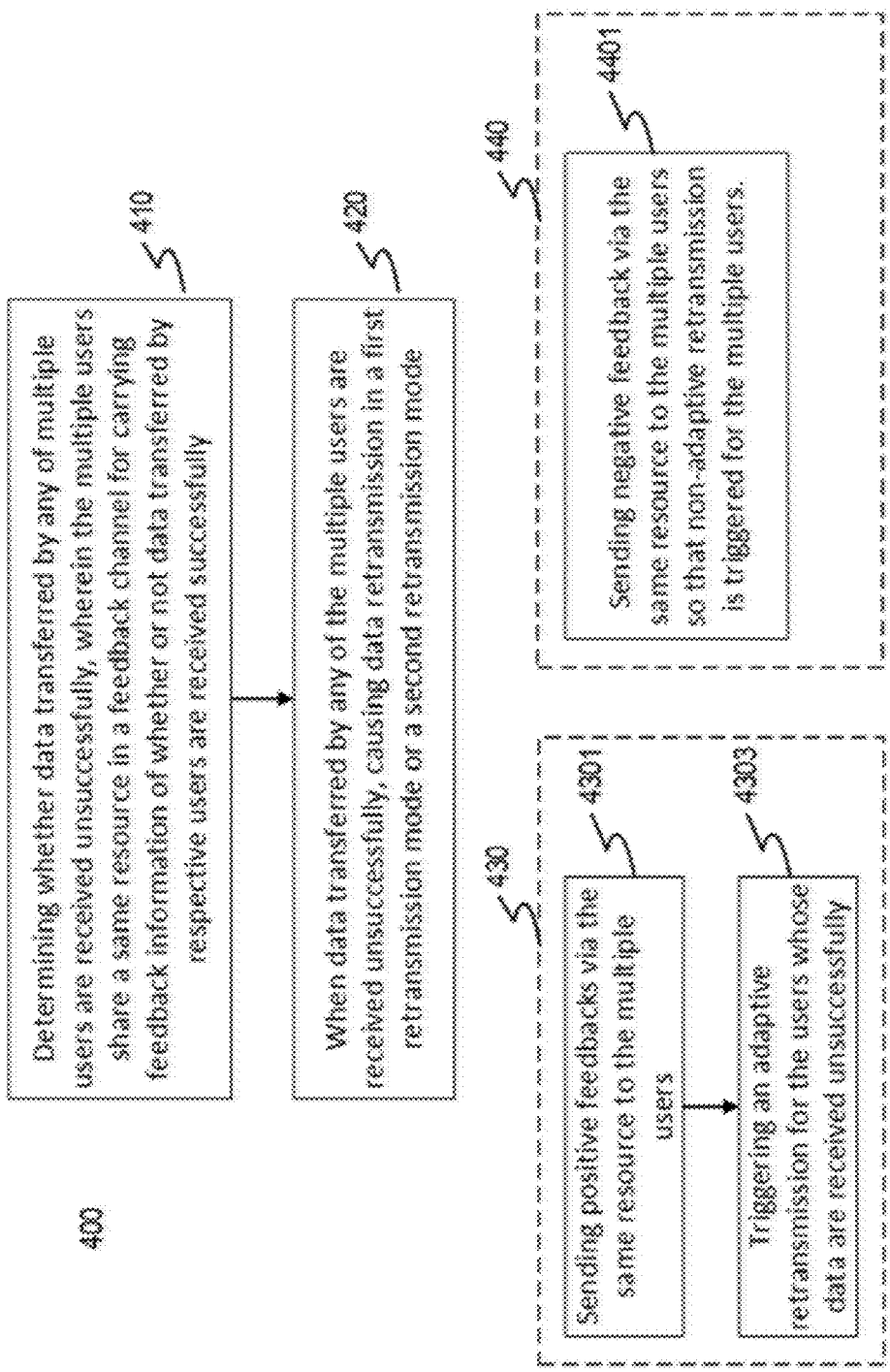
FIG. 4 illustrates a flowchart of a method according to at least part of embodiments of the present disclosure.

Reference is now made to FIG. 4, which illustrates a flowchart of a method according to some embodiments of the present disclosure. As shown in FIG. 4, the method 400 comprises determining whether data transferred by any of the multiple users are received unsuccessfully at block 410. The multiple users share a same resource in a feedback channel for carrying feedback information of whether or not data transferred by respective users are received successfully. When data transferred by any of the multiple users are received unsuccessfully, data retransmission is initiated in either a first retransmission mode or a second retransmission mode at block 420. In the first retransmission mode, positive feedback is sent via the same resource to the multiple users, and adaptive retransmission is triggered for the users whose data are received unsuccessfully. In the second retransmission mode, negative feedback is sent via the same resource to the multiple users so that non-adaptive retransmission is triggered for the multiple users.

In one embodiment, the method 400 can be executed at an access node, such as an eNB in an MU-MIMO system, as illustrated in FIG. 1. In another embodiment, the method 400 can be executed at another network entity, which can be communicatively connected to the access node.

In one embodiment, at block 420, the data retransmission may be initiated by selecting the first retransmission mode or the second retransmission mode for the data retransmission according to a predetermined scheme. For example, the predetermined scheme can be defined based on at least one of the following: a ratio of the number of users whose data are received successfully, to the number of the multiple users; an amount of available resources in a control channel; and a probability that a resource collision in the feedback channel occurs.

In one embodiment, in a case where the ratio of the number of users whose data are received successfully to the number of the multiple users, is higher than a first threshold, the first retransmission mode can be selected for the data retransmission. Optionally or additionally, in a case where the ratio is lower than a second threshold, the second retransmission mode can be selected for the data retransmission. The first threshold can be identical to the second threshold, or be different from the second threshold. The first threshold and the second threshold can be defined based on at least one of the following: an amount of available resources in a control channel; and an amount of available resources in a data traffic channel.

In one embodiment, the method 400 may further comprise assigning the same resource in the feedback channel to the multiple users. In case an embodiment is applied to an MU-MIMO system in LTE like that as shown in FIG. 1, the feedback channel may be a PHICH channel. For example, when it is determined that resources in the PHICH channel are insufficient, a same PHICH resource can be assigned to multiple users.

Optionally, in one embodiment, when data retransmission in the first retransmission mode is initiated, the method 400 may further comprise sending positive feedback via the same resource to the multiple users at block 4301, and triggering an adaptive retransmission for the users whose data are received unsuccessfully at block 4303. For example, the positive feedback may be HARQ ACK. The adaptive retransmission may be triggered by sending in a PDCCH channel to the users whose data are received unsuccessfully, a DCI with NDI not toggled.

Optionally, in one embodiment, when data retransmission in the second retransmission mode is caused, the method 400 may further comprise sending negative feedback via the same resource to the multiple users so that non-adaptive retransmission is instructed for the multiple users, at block 4401. For example, the negative feedback may be HARQ NACK.

It would be appreciated that embodiments of the disclosure are not limited to any specific for sending information for non-adaptive retransmission and adaptive retransmission to the users/UEs. Depending on network where embodiments of the disclosure are applied, different channels or signaling can be used for this purpose.

Figure 5:
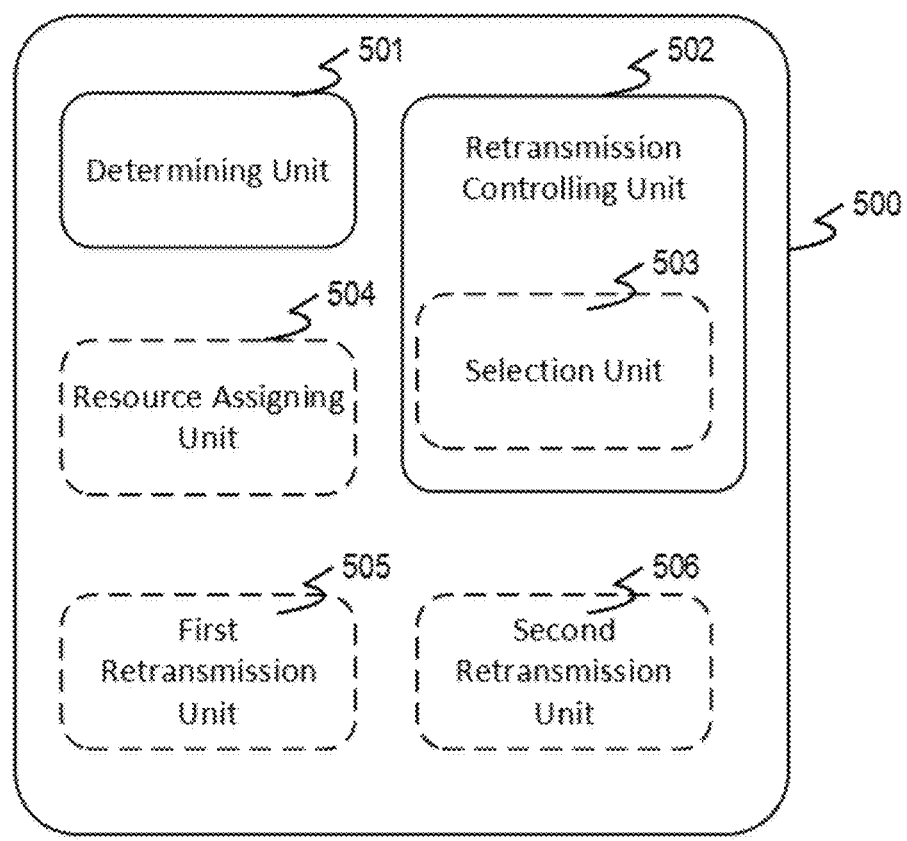
FIG. 5 illustrates a simplified block diagram of an apparatus according to at least part of embodiments of the present disclosure.

Reference is now made to FIG. 5, which illustrates a simplified block diagram of an apparatus 500 according to some embodiments of the present disclosure. The apparatus may be embodied in/as an access node in a multi-user system, which can communicate with multiple users in a same channel simultaneously. For example, the access node may be an eNB operating in an MU-MIMO system as illustrated in FIG. 1. In another embodiment, the apparatus 500 may be embodied in/as another entity at a network side, such as a server, which can be communicatively connected to the access node. The apparatus 500 is operable to carry out the exemplary methods 200 and 400 as described with reference to FIG. 2 and/or FIG. 4, and possibly any other processes or methods. It is also to be understood that any one of the methods 200 and 400 are not necessarily carried out completely by the apparatus 500. Some steps of the methods 200 and 400 may be performed by one or more other entities.

As illustrated in FIG. 5, the apparatus 500 comprises a determining unit 501, configured to determine whether data transferred by any of multiple users are received unsuccessfully. The multiple users share a same resource in a feedback channel for carrying feedback information of whether or not data transferred by respective users are received successfully. The apparatus 500 also comprises a retransmission controlling unit 502, configured to cause data retransmission in a first retransmission mode or a second retransmission mode when data transferred by any of the multiple users are received unsuccessfully. In the first retransmission mode, positive feedback is sent via the same resource to the multiple users, and adaptive retransmission is triggered for the users whose data are received unsuccessfully. In the second retransmission mode, negative feedback is sent via the same resource to the multiple users so that non-adaptive retransmission is triggered for the multiple users.

In one embodiment, the retransmission controlling unit 502 may comprise a selection unit 503, configured to select the first retransmission mode or the second retransmission mode for the data retransmission according to a predetermined scheme. The predetermined scheme may be defined based on at least one of the following: a ratio of the number of users whose data are received successfully, to the number of the multiple users; available resources in a control channel; and a probability that resource collisions in the feedback channel occur. For example, the ratio may be the ACK ratio defined above in an embodiment illustrated in FIG. 2.

In one embodiment, the selection unit 503 can be further configured to select the first retransmission mode for the data retransmission in a case where the ratio is higher than a first threshold. In this embodiment or another embodiment, the selection unit can be further configured to select the second retransmission mode for the data retransmission in a case where the ratio is lower than a second threshold.

In one embodiment, the apparatus 500 may further comprise a resource assigning unit 504, configured to assign a same resource in the feedback channel to the multiple users. The resource in the feedback channel may be a PHICH resource.

In one embodiment, the apparatus 500 may further comprise a first retransmission unit 505, configured to send positive feedback via the same resource to the multiple users, and trigger an adaptive retransmission for the users whose data are received unsuccessfully, when data retransmission in the first retransmission mode is caused by the retransmission controlling unit 502. Alternatively or additionally, in one embodiment, the apparatus 500 may further comprise a second retransmission unit 506, configured to send negative feedback via the same resource to the multiple users so that non-adaptive retransmission is triggered for the multiple users, when data retransmission in the second retransmission mode is caused by the retransmission controlling unit 502.

In some embodiments, the units of the apparatus 500 may be configured to implement the operations of corresponding blocks of the methods 200 and 400, and therefore relevant descriptions provided with reference to methods 200 and 300 also apply here and thus details will not be repeated.

Figure 6:
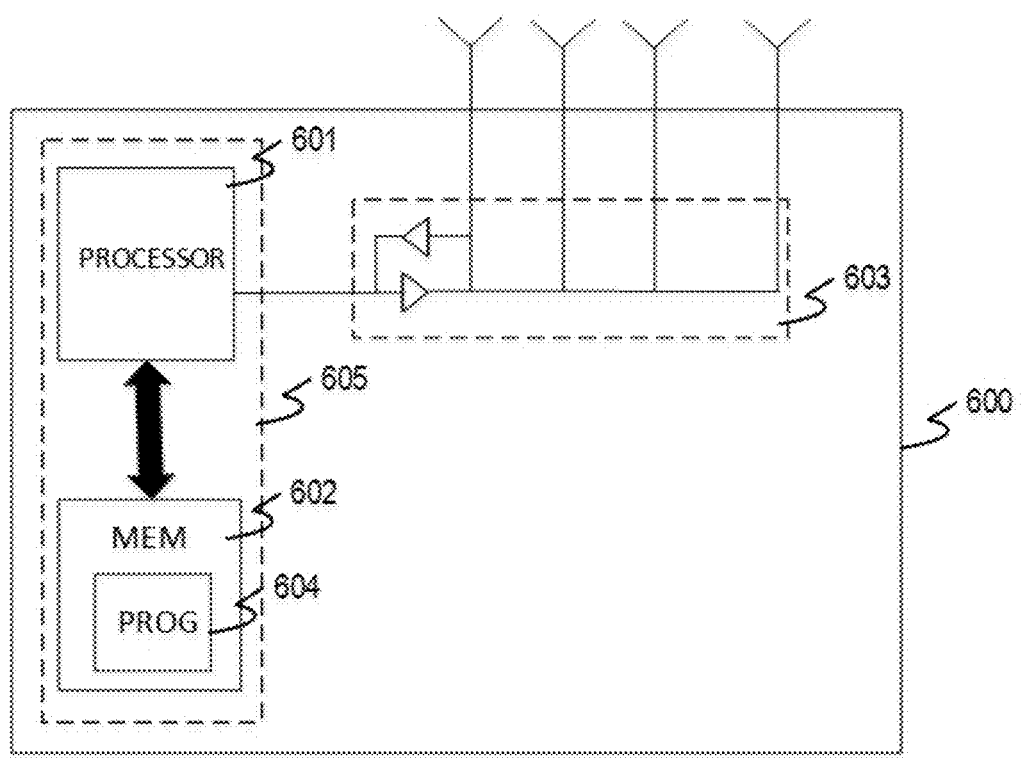
FIG. 6 illustrates a simplified block diagram of an apparatus according to at least part of embodiments of the present disclosure.

FIG. 6 illustrates a simplified block diagram of an apparatus 600 according to at least part of embodiments of the present disclosure. The apparatus 600 may be embodied in/as an access node in a multi-user system, which can communicate with multiple users in a same channel simultaneously. For example, the access node may be an eNB operating in an MU-MIMO system as illustrated in FIG. 1. In another embodiment, the apparatus 600 may be embodied in/as another entity at a network side, such as a server, which can be communicatively connected to the access node.

The apparatus 600 may comprise at least one processor 601, such as a data processor (DP) and at least one memory (MEM) 602 coupled to the processor 601. The apparatus 600 may further comprise a transmitter TX and receiver RX 603 coupled to the processor 601. The MEM 602 stores a program (PROG) 604. The PROG 604 may include instructions that, when executed on the associated processor 601, enable the apparatus 600 to operate in accordance with the embodiments of the present disclosure, for example to perform the method 200 or 400. A combination of the at least one processor 601 and the at least one MEM 602 may form processing means 605 adapted to implement various embodiments of the present disclosure.

Various embodiments of the present disclosure may be implemented by computer program executable by the processor 601, software, firmware, hardware or in a combination thereof. The processors 601 may be of any type suitable to the local technical environment, and may include one or more of general purpose computers, special purpose computers, microprocessors, digital signal processors DSPs and processors based on multicore processor architecture, as non-limiting examples. The MEMs 602 may be of any type suitable to the local technical environment and may be implemented using any suitable data storage technology, such as semiconductor based memory devices, magnetic memory devices and systems, optical memory devices and systems, fixed memory and removable memory, as non-limiting examples.

The transmitter TX and receiver RX 603 can have multiple antennas that utilize various transmission diversity schemes for supporting the MU-MIMO technology. For example, the apparatus 600 can comprise two transmit antennas, or four transmit antennas that support beamforming as illustrated in FIG. 1.

Although some embodiments are described in the context of an exemplary system shown in FIG. 1, it should not be construed as limiting the spirit and scope of the present disclosure. The principle and concept of the present disclosure may be more generally applicable to other system architectures, such as a Wi-Fi system.

In addition, the present disclosure may also provide a carrier containing the computer program as mentioned above, wherein the carrier is one of an electronic signal, optical signal, radio signal, or computer readable storage medium. The computer readable storage medium can be, for example, an optical compact disk or an electronic memory device like a RAM (random access memory), a ROM (read only memory), Flash memory, magnetic tape, CD-ROM, DVD, Blue-ray disc and the like.

The techniques described herein may be implemented by various means so that an apparatus implementing one or more functions of a corresponding apparatus described with an embodiment comprises not only prior art means, but also means for implementing the one or more functions of the corresponding apparatus described with the embodiment and it may comprise separate means for each separate function, or means that may be configured to perform two or more functions. For example, these techniques may be implemented in hardware (one or more apparatuses), firmware (one or more apparatuses), software (one or more modules), or combinations thereof. For a firmware or software, implementation may be made through modules (e.g., procedures, functions, and so on) that perform the functions described herein.

Exemplary embodiments herein have been described above with reference to block diagrams and flowchart illustrations of methods and apparatuses. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It will be obvious to a person skilled in the art that, as the technology advances, the inventive concept can be implemented in various ways. The above described embodiments are given for describing rather than limiting the disclosure, and it is to be understood that modifications and variations may be resorted to without departing from the spirit and scope of the disclosure as those skilled in the art readily understand. Such modifications and variations are considered to be within the scope of the disclosure and the appended claims. The protection scope of the disclosure is defined by the accompanying claims.

What is claimed is:

1. A method for controlling data retransmission in a multi-user system, the method comprising:
    determining whether data transferred by any of multiple users are received unsuccessfully, wherein the multiple users share a same resource in a feedback channel for carrying feedback information of users are received successfully; and
    when data transferred by any of the multiple users are received unsuccessfully, selecting, for data retransmission, a first retransmission mode or a second retransmission mode according to a predetermined scheme,
    wherein in the first retransmission mode, positive feedback is sent via the same resource to the multiple users, and adaptive retransmission is triggered for the users whose data are received unsuccessfully, and
    wherein in the second retransmission mode, negative feedback is sent via the same resource to the multiple users so that non-adaptive retransmission is triggered for the multiple users, and
    wherein the predetermined scheme is defined based on at least one of the following:
        a ratio of the number of users whose data are received successfully, to the number of the multiple users;
        an amount of available resources in a control channel; and
        a probability that resource collisions in the feedback channel occur.

2. The method according to claim 1, wherein the selecting comprises:
    selecting the first retransmission mode for the data retransmission in a case where the ratio is higher than a first threshold.

3. The method according to claim 1, wherein the selecting comprises:
    selecting the second retransmission mode for the data retransmission in a case where the ratio is lower than a second threshold.

4. The method according to claim 3, wherein the first threshold and the second threshold are defined based on at least one of the following:
    an amount of available resources in a control channel; and
    an amount of available resources in a data traffic channel.

5. The method according to claim 1, further comprising:
    assigning the same resource in the feedback channel to the multiple users.

6. The method according to claim 1, further comprising:
    when data retransmission in the first retransmission mode is caused, sending positive feedback via the same resource to the multiple users, and triggering an adaptive retransmission for the users whose data are received unsuccessfully.

7. The method according to claim 6, wherein instructing adaptive retransmission for the users whose data are received unsuccessfully comprises:
    sending to the users whose data are received unsuccessfully, downlink control information with a new data indication not toggled.

8. The method according to claim 1, further comprising:
    when data retransmission in the second retransmission mode is caused, sending negative feedback via the same resource to the multiple users so that non-adaptive retransmission is triggering for the multiple users.

9. The method according to claim 1, wherein the feedback channel is a Physical Hybrid ARQ Indicator Channel.

10. The method according to claim 1, wherein the system is a Multi-User Multiple-Input Multiple-Output system.

11. An apparatus for controlling data retransmission in a multi-user system, the apparatus comprising:
    at least a processor, and
    a memory, communicatively associated with the processor with computer coded instructions stored therein, said instructions when executed by the processor causing the apparatus to perform:
    determine whether data transferred by any of multiple users are received unsuccessfully, wherein the multiple users share a same resource in a feedback channel for carrying feedback information of whether or not data transferred by respective users are received successfully; and
    when data transferred by any of the multiple users are received unsuccessfully, select, for data retransmission, a first retransmission mode or a second retransmission mode according to a predetermined scheme,
    wherein in the first retransmission mode, positive feedback is sent via the same resource to the multiple users, and adaptive retransmission is triggered for the users whose data are received unsuccessfully, and
    wherein in the second retransmission mode, negative feedback is sent via the same resource to the multiple users so that non-adaptive retransmission is triggered for the multiple users, and
    wherein the predetermined scheme is defined based on at least one of the following:
        a ratio of the number of users whose data are received successfully, to the number of the multiple users;
        an amount of available resources in a control channel; and
        a probability that resource collisions in the feedback channel occur.

12. A non-transitory computer readable storage medium storing computer coded instructions which, when executed on at least one processor, cause the at least one processor to:
    determine whether data transferred by any of multiple users are received unsuccessfully, wherein the multiple users share a same resource in a feedback channel for carrying feedback information of whether or not data transferred by respective users are received successfully; and
    when data transferred by any of the multiple users are received unsuccessfully, select, for data retransmission, a first retransmission mode or a second retransmission mode according to a predetermined scheme,
    wherein in the first retransmission mode, positive feedback is sent via the same resource to the multiple users, and adaptive retransmission is triggered for the users whose data are received unsuccessfully, and wherein in the second retransmission mode, negative feedback is sent via the same resource to the multiple users so that non-adaptive retransmission is triggered for the multiple users, and wherein the predetermined scheme is defined based on at least one of the following:
- a ratio of the number of users whose data are received successfully, to the number of the multiple users;
- an amount of available resources in a control channel; and
- a probability that resource collisions in the feedback channel occur.

\* \* \* \* \*